United States Patent [19]

Ripper et al.

[11] Patent Number: 4,462,376

[45] Date of Patent: Jul. 31, 1984

[54] METHOD AND APPARATUS FOR DETERMINING AND CONTROLLING THE EXHAUST GAS RECIRCULATION RATE IN INTERNAL COMBUSTION ENGINES

[75] Inventors: Wolfgang Ripper; Max Straubel, both of Stuttgart; Wolf Wessel, Oberriexingen, all of Fed. Rep. of Germany

[73] Assignee: Robert Bosch GmbH, Stuttgart, Fed. Rep. of Germany

[21] Appl. No.: 426,328

[22] Filed: Sep. 29, 1982

[30] Foreign Application Priority Data

Jun. 3, 1982 [DE] Fed. Rep. of Germany ....... 3220832

[51] Int. Cl.³ .............................................. F02M 25/06
[52] U.S. Cl. ..................................... 123/571; 123/569
[58] Field of Search ......................... 123/569, 571, 568

[56] References Cited

U.S. PATENT DOCUMENTS 2,317,582  4/1943  Bicknell .............................. 123/568
4,060,065 11/1977  Hata et al. ........................... 123/571
4,181,944  1/1980  Yamauchi et al. .................. 123/569
4,280,471  7/1981  Masaki ................................ 123/571

Primary Examiner—Wendell E. Burns
Attorney, Agent, or Firm—Edwin E. Greigg

[57] ABSTRACT

A method and an apparatus are proposed for determining and controlling an exhaust gas recirculation rate in internal combustion engines (Diesel engines), wherein an adjusting member in the exhaust gas recirculation line is adjusted by a regulator in order to attain precise regulation of the exhaust gas quantity recirculated to the aspirated air zone. The regulator is supplied with the exhaust gas temperature (T4) measured at a given time as the load signal for the engine. The comparison value of the regulator is then either an actual value of the exhaust gas recirculation rate, ascertained by means of effective temperature measurements in the intake zone of the engine, or a set-point differential temperature which is produced by means of measuring the aspirated air quantity at a given time and the rpm.

6 Claims, 5 Drawing Figures

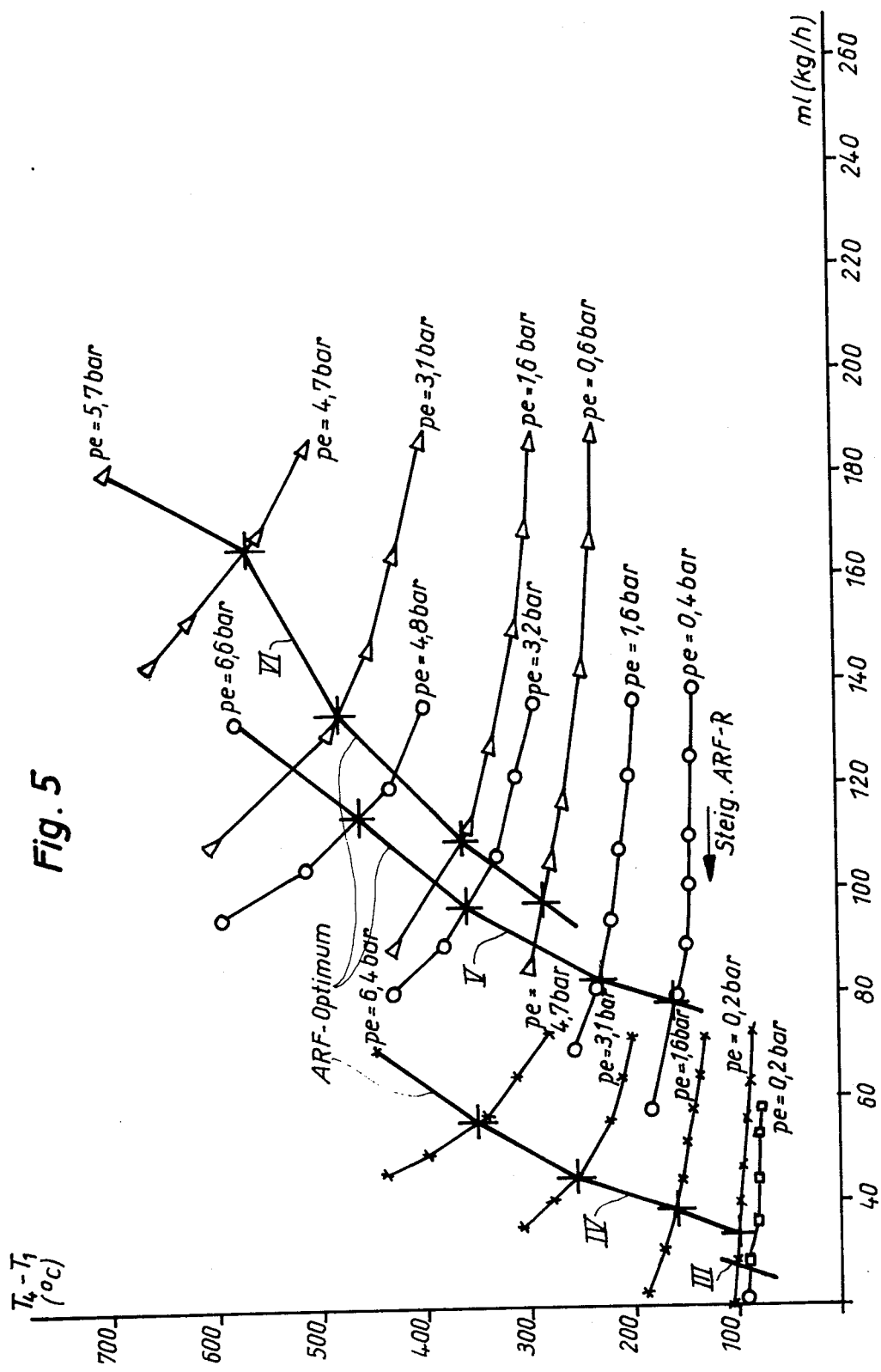

1

METHOD AND APPARATUS FOR DETERMINING AND CONTROLLING THE EXHAUST GAS RECIRCULATION RATE IN INTERNAL COMBUSTION ENGINES

BACKGROUND OF THE INVENTION

The invention is based on a method and an apparatus for determining and controlling the exhaust gas recirculation rate in internal combustion engines. In order to determine the exhaust gas recirculation rate in internal combustion engines, specifically Diesel engines, it is known (from U.S. Pat. No. 4,060,065) to obtain a first datum evaluatable for closed-loop control purposes by means of temperature measurements, which are performed in the inlet area of the Diesel engine and in the final analysis indicate the ratio between the mass of the fresh-air current delivered to the engine and the recirculated exhaust gas current. By means of suitably forming a difference signal, in the known apparatus, a signal used as an actual value is produced at the output of an electronic computer circuit for the exhaust gas recirculation rate, which is linked at a comparison device with a signal which in this case represents the set-point value of the exhaust gas recirculation; the control deviation acts as a trigger variable for adjusting an adjusting member, for instance, a valve, in the exhaust gas recirculation line. The set-point value may be either a predetermined, constant value, such as a comparison voltage, or a signal obtained from specific operating rates of the engine, composed for instance of an rpm signal, an inlet vacuum signal and a generalized engine temperature signal. In the known apparatus, it is disadvantageous that the establishment of an optimal exhaust gas recirculation rate is not even attempted and, if a variable set-point value is used at all, such a value is obtained only quite generally from operating rates of the engine, without more precise data. However, for reasons having to do with ever-increasing pollution and the general scarcity of energy, it is indispensable to operate a Diesel engine as precisely as possible in its general operating data, particularly to keep the exhaust gas recirculation rate within the optimal range as precisely as possible, and naturally at the least possible expense, so that, in particular, it would be possible to compensate for impermissible smoke development, inaccuracies of the engine, possibly incomplete combustion and the like.

It is also known, in order to determine the exhaust gas recirculation rate, to provide mechanically controlled or mechanically regulated systems having measurement of air and fuel quantities; such systems are complicated and expensive and may be subject to increased aging effects.

OBJECT AND SUMMARY OF THE INVENTION

It is accordingly an object of the present invention to indicate a method and an apparatus for determining the exhaust gas recirculation rate in Diesel engines, which is suitable for application to desired types of fuel supply systems for Diesel engines and which enables particularly precise regulation of the exhaust gas recirculation rate while detecting engine reactions.

The method and apparatus according to the invention attains this object, and has the advantage that in order to determine a regulating variable as a criterion, the effective load status of the engine is used, so that the exhaust gas recirculation rate can be established such that it can be guided precisely to the optimal value for each rpm. A particular advantage is also that only a temperature measurement of the exhaust gas, preferably as close as possible to the outlet valve, needs to be performed in order to detect the load status, because it has been recognized that the optimal exhaust gas recirculation rate has an unequivocal relationship to the exhaust gas temperature of the engine. Corresponding measurements therefore produce a family of curves which can be utilized directly for closed-loop control of the optimal exhaust gas recirculation quantity.

A further advantage is that the system according to the invention for determining the exhaust gas recirculation rate detects the chemical-thermodynamic engine reactions, so that a drift behavior in the correct direction is produced, if such a drift behavior occurs at all. The invention is equally well suited to mechanically and electrically regulated fuel pumps, and can thus be used with all types of fuel pumps. Specialized pumps or low-pressure cycles are not required.

A further advantage in the present invention is that the load signal for regulating fluctuating air pressure, based on a temperature measurement, is self-compensating, because with a small air mass, an unaltered high fuel mass produces a higher temperature value on the part of the exhaust gas, whereupon the system makes a corresponding correction by way of the regulation performed by it of the exhaust gas recirculation rate.

As a result of the characteristics disclosed, advantageous further developments of and improvements to the invention are possible. A fluctuating outdoor temperature effect can be "compensated for" by means of forming a difference between the exhaust gas temperature, measured in terms of the load status, and the ambient air temperature; however, in place of the ambient air measurement, a temperature measurement of the aspirated air directly upstream of the inlet valve can also be used in an advantageous manner. The temperature difference thus obtained (exhaust gas temperature minus aspirated air temperature at the inlet valve) has the advantage that it more closely represents thermodynamic events of the engine.

If in accordance with an advantageous further development of the present invention, the temperature difference signal is used as an actual value for the regulation of the exhaust gas recirculation, and if the set-point value is obtained with the aid of an air quantity measurement and the evaluation of the engine rpm at that time, then in this case as well the result is a simple evaluation of signals via temperature sensors; temperature transducer tolerances, possible deviations during injection onset and variations in the aspirated air temperature are capable of causing only very small possible lambda errors.

The invention will be better understood and further objects and advantages thereof will become more apparent from the ensuing detailed description of preferred embodiments taken in conjunction with the drawings.

BRIEF DESCRIPTION OF THE DRAWINGS

FIG. 5, in the form of a performance graph for various engine speeds, shows the dependency of the exhaust gas temperature or the difference between the exhaust gas temperature and the aspirated air temperature over that of the aspirated air quantity.

DESCRIPTION OF THE PREFERRED EMBODIMENTS

The fundamental concept of the present invention is the use of an exhaust gas temperature signal as a datum for the load, which is an essential signal in the closed-loop control of a Diesel engine to optimal exhaust gas recirculation rates.

Figure 1:
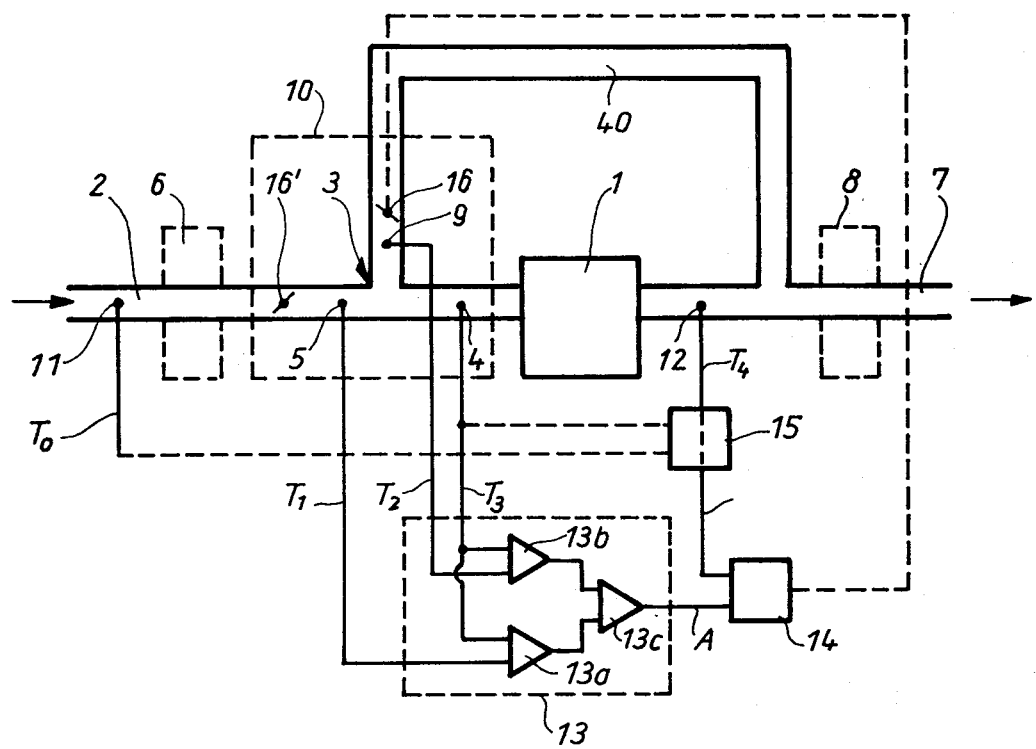
FIG. 1 is a schematic form which shows an exhaust gas recirculation system in Diesel engines having thermal control.

FIG. 1 shows in schematic form an air inlet or intake tube 2 which feeds fresh air to an internal combustion engine 1. The exhaust gas is directed through the exhaust outlet 7. An exhaust gas recirculation line 40 connects with the exhaust outlet 7 and discharges into the intake tube at 3. Downstream of the discharge point at 3, approximately at 4, a turbulence thus produced by the discharge brings about a homogeneous mixing of the aspirated air, and the temperature T3 of the aspirated mixed gases is measured approximately in this area by a measuring device located at 4, and is used in combination with further temperature measurement signals for determining the actual value of the exhaust gas recirculation rate (for this exemplary embodiment), as will be explained in greater detail below.

A further temperature measurement device is provided at 5 upstream of the exhaust discharge 3 for measuring the aspirated air temperature T1. This measurement device may be located downstream of an exhaust gas turbocharger 6, which may be provided if needed and as indicated by dashed lines; the turbine zone of this exhaust gas turbocharger is indicated at 8 in the vicinity of the exhaust gas tube 7.

In order to complete the measurement data required for determining the actual value of the exhaust gas recirculation rate, a further measurement device is finally provided in the form of a temperature measuring device at location 9, upstream of the discharge area 3 at which the recirculated exhaust gas discharges into the intake tube; the temperature T2 of the recirculated exhaust gas can be determined with this temperature measurement. If desired, as indicated by dashed lines at 10, this space for the measurement of temperatures T1, T2 and T3 can be heat-insulated with respect to the surroundings.

As shown in FIG. 1, a further temperature measurement location is provided at 11 for determining the ambient air temperature T0 and a temperature measuring device downstream of the engine determines the exhaust gas temperature T4.

The following discussion relates first to obtaining an actual value datum for the exhaust gas recirculation rate A. The following table once again summarizes the various temperature data of the measurement locations just mentioned:

T0 = Ambient air temperature
T1 = Aspirated air temperature
T2 = Temperature of the recirculated exhaust gaseous medium
T3 = Temperature of the aspirated mixed gaseous medium
T4 = Exhaust gaseous medium temperature At the mixing location of the discharge of the exhaust gas recirculation line 40 into the intake tube, the quantity of heat given off by the exhaust gas during the mixing process is equal to the quantity of heat absorbed by the fresh air supplied; expressed in the form of a formula, $$\text{Heat absorbed by Fresh Air Supply} = \text{Heat given off by the Exhaust Gas} \tag{1}$$

Accordingly, $$\dot{m}_A \cdot C_{PA} \cdot (T2 - T3) = \dot{m}_L \cdot C_{PL} \cdot (T3 - T1) \tag{2}$$

The symbols $\dot{m}_A$ und $\dot{m}_L$ refer, respectively, to the quantity of the exhaust gaseous medium and the quantity of the fresh air per unit of time; $C_{PA}$ and $C_{PL}$ are the specific heats of the air and of the exhaust gaseous medium, respectively, at a constant pressure; it may thereby be presumed that in each case the ratio of the specific heats remains constant in accordance with temperature. The exhaust gas recirculation ratio is accordingly:

$$A = \frac{\dot{m}_A}{\dot{m}_L} = \frac{C_{PA}}{C_{PL}} \cdot \frac{(T2 - T3)}{(T3 - T1)} \tag{3}$$

or, in simplified form and for $T2 \neq T1$ $$A = (T2 - T3)/(T3 - T1) \tag{4}$$

As shown in FIG. 1, a computer circuit 13 is shown by way of example for determining the actual exhaust gas recirculation rate A; this computer circuit may be in principle of any arbitrary design, and in the illustrated form two differential amplifiers 13a and 13b are provided, at which the difference between the temperatures is formed as given in the formula. The output values of these differential amplifiers 13a, 13b are then supplied to a further computer member 13c. The computer 13c enters the two temperature differences and when the output of this member is in accordance with the ratio difference of the two signals, then the actual value A of the exhaust gas recirculation rate appears. From what has already been said, it will be understood that the two temperature differences T2−T3 and T3−T1 determine the ratio between the masses of the two parts of the flow (fresh air and exhaust gas). The simplification thus attained in that the specific heats $C_{PL} \approx C_{PA}$ are approximately equal results solely in deviations of the second order of magnitude, which under some circumstances may be calibrated.

A mass measuring device based solely on thermal measurements of this kind functions satisfactorily so long as T1 is not equal to T2, which is most always the case in aspirating engines and may also be true for supercharged engines.

As an alternative to the exemplary embodiment of the computer circuit 13, the temperature differences may also, however, be determined in that thermal pairs switched opposite to one another can be used for the measurement; preferable thermal elements in this case are normal pairs of wires or metal coatings vapor-deposited on thin carrier plates, the pairs partially overlapping one another. Measuring elements of this kind are mechanically stable and have a large surface area in comparison with their volume, which produces a short response time.

It is now necessary to associate the exhaust gas recirculation rate A thus obtained with the load $p_e$ of the engine at a given rpm. In accordance with an advantageous embodiment of the present invention, a good criterion for the load of the engine is the exhaust gas temperature T4 (or, if a datum relating to the ambient air temperature is also to be used, then the temperature difference T4−T0); the use of the exhaust gas temperature T4 as a load criterion is particularly advantageous if a constant injection onset, or an injection onset adhered to precisely in accordance with a performance graph, can be presumed. A temperature measurement of this kind avoids engine torque measurements which are difficult to perform. Alternatively, and as needed, the position of the adjusting lever or the injection duration may be used for determining the engine load.

Figure 2:
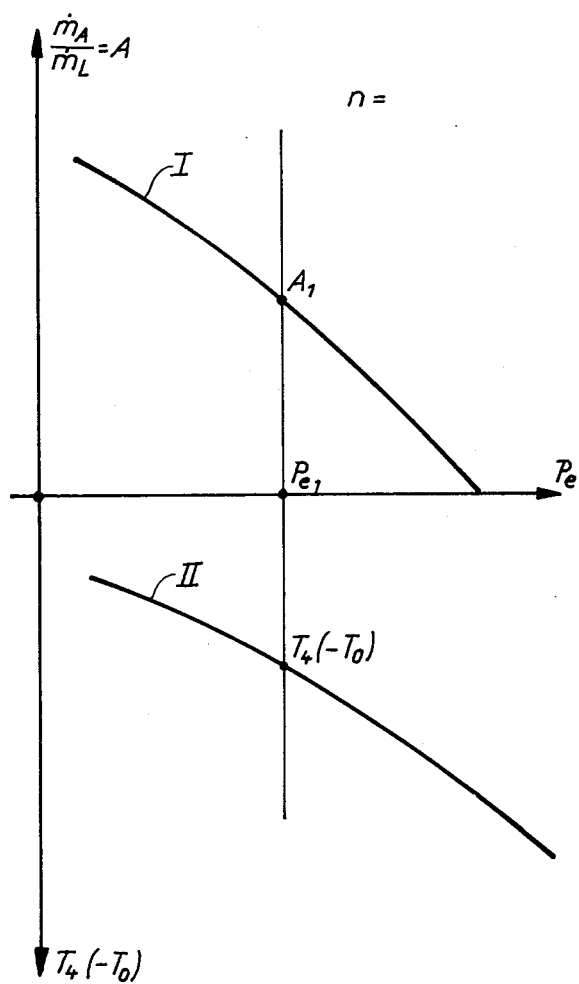
FIG. 2, in the form of graphic curves, shows the dependency of the exhaust gas recirculation rate and the exhaust gas temperature on the load of the engine for a given rpm.

The correctness of the use of the exhaust gas temperature as an indication of load is demonstrated by the curve courses shown in FIG. 2, which schematically show the course of the exhaust gas recirculation rate (curve I) and the exhaust gas temperature T4 or of the temperature difference T4−T0 (curve II) plotted over the load $p_e$. The set-point curves A and T4 (or T4−T0) set-point curves apply for an rpm n which is constant.

The temperature signal T4 is capable of at least partially compensating for the fluctuating outdoor air pressure, because at a small air mass $\dot{m}_L$, an unaltered large fuel mass causes a higher T4, which accordingly corrects the system via the change in the exhaust gas recirculation rate A, which change T4.

Possible inaccuracies in the engine, such as pistons and valves which are not tight, which may cause a smaller air quantity, or poor nozzles and accordingly incomplete combustion, can also be compensated for by the overall thermal control, so that impermissible smoke is avoided or at least reduced considerably.

A fluctuating outdoor temperature can be detected by means of forming the difference of T4−T0.

One embodiment of the present invention is provided in that for correcting the obtained thermal data, a typical component temperature of the engine itself can be used, for instance by measuring the temperature at the outlet valve seat; it is thus possible to detect the thermal status of the engine correctly.

Care must also be taken in measuring T1 and T2 that the partial flows upstream do not influence one another, or in other words that sufficiently long measurement paths are available. At the location of the T3 measurement, a homogeneous mixture of the partial flows should be assured, which can be attained with the aid of swirl vanes in the intake tube or by other means assuring sufficient mixing. The T4 measurement should be performed such that the dynamic energy content of the flow of the exhaust gas can be detected in a reproducible manner.

Although the temperature measurement is comparatively slow in principle, the time behavior of a thermal control means of this kind is comparatively favorable, even if it is presumed that in comparison with the other temperature measurements a relatively rapid change in the exhaust gas temperature T4 is occurring. In the aspirating engine, T1 as the aspirated air temperature, is furthermore quasi-constant; T2, because of the heat capacity of the lines, only varies slowly; and T3 fluctuates with the regulating speed of the exhaust gas recirculation system, which is approximately in the range between 0.3 and 1 second.

A further advantageous embodiment of the present invention may be attained in that in order to improve the regulated behavior, a pilot control is utilized via the adjusting lever position of the pump regulator, and if the requirements for precision are low, it may be possible to use the adjusting lever position exclusively as a load datum.

Finally, in a further embodiment it is possible, in internal combustion engines which have injection onset regulating devices for attaining good exhaust emission values, to use signals derived from these devices in combination with the present invention, that is, injection onset and injection duration signals (SD signals). In combination with the described exhaust gas recirculation rate measurement, an injection duration measurement is then sufficient as load information.

It will be understood that the linking of the obtained temperature data as set-point values can be performed both via performance graphs and via characteristic curves, either deviating from or augmenting the computer circuit 13 discussed above. This computer circuit should then be augmented by a subsequent regulator 14, which is supplied at one input with the actual value of the exhaust gas recirculation rate A from the computer circuit 13 and at its other input with the load signal thus to be linked as a set-point value with the actual value. A further computer element 15 may be included between the temperature-measuring location for the exhaust gas temperature T4 and the regulator 14, which may for example be a simple adding member, in order to perform the linkage with the ambient temperature T0 if desired. The output of the regulator 14 is then fed back to the adjusting member 16 in the exhaust gas recirculation line 40, as indicated by dashed lines; the adjusting member 16 may be a regulating valve of any arbitrary embodiment. Alternatively and in addition, a further regulating valve 16' may also be provided in the intake tube 2; by this means as well, the effective exhaust gas recirculation rate can be adjusted to the desired value from the output of the regulator 14.

Figure 3:
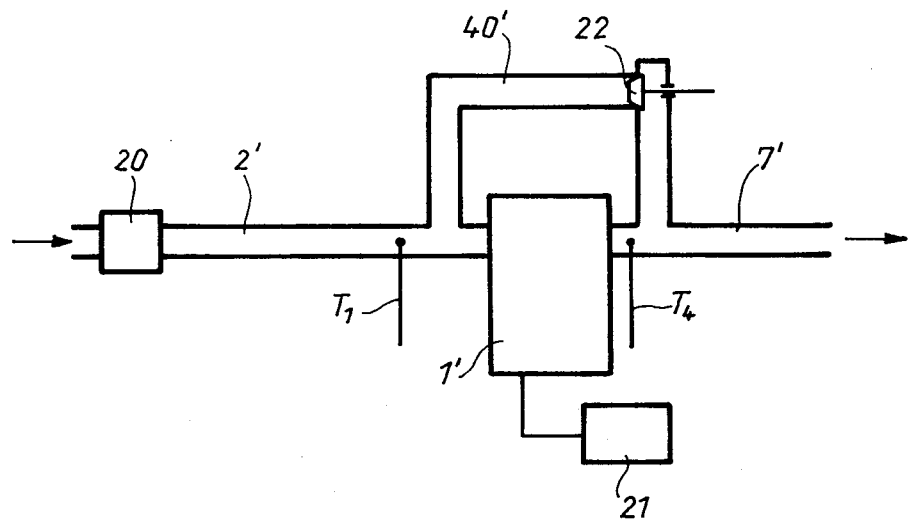
FIGS. 3 and 4 relate to a further exemplary embodiment of the present invention, in which the exhaust gas temperature is evaluated as a load signal, and the drawing shows the measurement apparatus for determining a performance graph for optimal exhaust gas recirculation rates and the regulator circuit for processing the engine data obtained.
Figure 4:
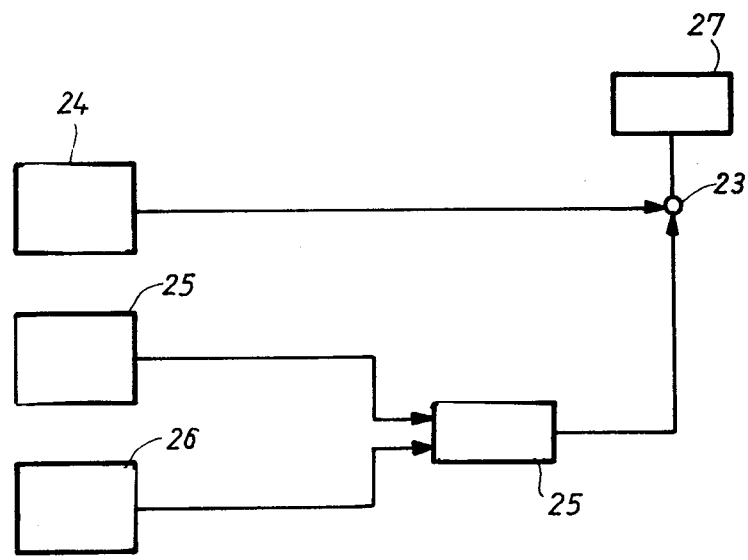

A particularly advantageous further embodiment of the present invention, finally, is provided in that as shown in FIGS. 3, 4 and 5, again in order to regulate the exhaust gas recirculation rate A in a Diesel engine, the exhaust gas temperature T4 is used, possibly in the form of the temperature difference of the exhaust gas temperature T4 minus aspirated air temperature T1 (in the aspirating engine) or exhaust gas temperature T4 minus air temperature downstreams of the turbocharger in an engine with a turbocharger. The partial view of the present invention shown in FIGS. 3, 4 and 5 is based on the recognition that a performance graph is first prepared, which in the form of a family of curves illustrates the exhaust gas temperature T4, or the differential value T4−R1, in accordance with the load of the engine, the aspirated air mass $\dot{m}_L$ and the engine rpm n; the performance graph is shown in FIG. 5. A design for measurement which simultaneously shows the fundamental design of an internal combustion engine in schematic form is given in FIG. 3; an air flow rate meter 20 is provided and associated with the engine 1' at the inlet of the intake tube 2', which fixes the proportion of fresh air in the total air quantity delivered to the internal combustion engine. Also shown and associated with the engine 1' are an rpm measuring device 21, which is capable of generating an rpm-proportional rectangular pulse train at its output and an adjusting valve 22 in the exhaust gas recirculation line 40', this valve being acted upon by the regulator for the exhaust gas recirculation rate. If the basic diagram of FIG. 3 is first laid out in the form of a measuring circuit, then curve courses for various different loads $p_e$ of the engine at a constant rpm are produced, which illustrate the behavior of the exhaust gas temperature T4 or of the differential value T4—T1 when the exhaust gas recirculation rate changes.

For the sake of a better understanding of the invention, the following points are noted in reference to FIG. 5: Load curves indicated by squares relate to a constant rpm of 800 $min^{-1}$, while measurement points indicated by a small x, which are then interconnected into individual curve courses, provide various load curves at a constant rpm of $n=1000$ $min^{-1}$. The circular markings relate to load curves at the constant rpm of $n=2000$ $min^{-1}$, and load curves having triangular measurement points produce measurement values obtained at a constant rpm of $n=3000$ $min^{-1}$. In order to provide better comprehension of the diagram, the individual characteristic curves, at their right-hand terminal points in the plane of the drawings, each has the load datum which is a criterion for this particular curve course and in such terms also represents a contant load of the particular engine; along the various curves toward the left in the plane of the drawing, the fresh-air quantity $\dot{m}_L$ supplied accordingly to the engine becomes continuously smaller as the exhaust gas temperature T4 varies at first only gradually but does increase; in other words, the exhaust gas recirculation rate increases.

It is now possible to enter the differential temperature T4—T1 for the optimal exhaust gas rate into these individual characteristic curves and then to connect the points at a constant rpm (the solid lines) with one another. The results then, as shown in FIG. 5, are the curve courses shown at III-VIII, relating respectively to the rpms 800 $min^{-1}$, 1000 $min^{-1}$, 2000 $min^{-1}$ and 3000 $min^{-1}$. These curves further illustrate that an unequivocal relationship exists between the differential temperature T4—T1, or the pure exhaust gas temperature, and the aspirated air mass. In accordance with this partial aspect of the present invention, regulation is performed along these lines for the optimal exhaust gas recirculation rate A; FIG. 4 shows one possible exemplary embodiment of a block circuit diagram for an exhaust gas recirculation rate regulation means of this kind. It will be appreciated that in this case as well, the exhaust gas temperature is used; however, it is used as the actual value corresponding to the load signal and is delivered for linking with a set-point value for the exhaust recirculation system to the comparison or adding node 23. The block furnishing the temperature difference T4—T1 corresponding to the load signal is temperature sensor 24. In order to ascertain a set-point differential temperature, the procedure is such that a computer circuit 28 ascertains the corresponding set-point value on the basis of the signals delivered to it relating to the instantaneously measured aspirated air mass and the engine rpm n. The sensor 25 for determining the aspirated air mass may therefore correspond to the air flow rate meter 20 shown in FIG. 3, while the transducer 26 for the engine rpm n may be embodied by block 21 in FIG. 3. The comparison between the set-point differential temperature, based on the air quantity and engine rpm, and the actual differential temperature then takes place at 23. If the set-point temperature differs from the actual temperature, then the exhaust gas recirculation regulator 27 which follows the comparison point 23 opens or closes the valve 22 in the exhaust gas recirculation line 40' accordingly. If the actual value is larger than the set-point value, there is a reinforced closure of the valve 22, as a result of which the aspirated air mass varies. A new set-point differential temperature is then ascertained from the new air mass and the engine rpm and this is again compared with the likewise new actual differential temperature. The adjustment is effected until such time as the set-point value and the actual value agree.

The following relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A method for determining and controlling the exhaust gas recirculation rate in internal combustion engines (in particular Diesel engines) comprising detecting and measuring the exhaust gas temperature (T4) as a criterion for the load status of the engine forming an actual value $A_{actual}$ of the exhaust gas recirculation rate in accordance with characteristics of the internal combustion engine, forming a set point value $A_{set\ point\ value}$ of the exhaust gas recirculation rate with the aid of a load signal dependent on the exhaust gas temperature, and comparing a value of the exhaust gas recirculating rate with the exhaust gas temperature, and adjusting an adjusting member in an exhaust gas recirculation line in accordance with an output signal due to said comparison to influence the exhaust gas recirculation rate in accordance with $A_{actual}$ and $A_{set\ point\ value}$.

2. A method as defined by claim 1, in which the actual value of the exhaust gas recirculation rate is determined by relating the temperature measurements to the aspirated air temperature (T1) upstream of a mixing location of the aspirated air with the recirculated exhaust gas, to the temperature of the recirculated exhaust gas (T2) in the exhaust gas recirculation line upstream of the mixing location, and relating the temperature of the aspirated mixed gas (T3) downstream of the mixing location such that the obtained temperature values follow the formula (T2—T3)/(T3—T1), are linked together and delivered to a first input of a regulator for control of the adjusting member in the exhaust gas recirculation line.

3. A method as defined by claim 2, which includes obtaining a signal relating the exhaust gas temperature (T4) to the ambient air temperature upstream of the mixing location of aspirated air with the recirculated exhaust gas to obtain a difference signal which is supplied to a second input of the regulator.

4. A method as defined by claim 1, which comprises ascertaining curve courses for the optimal exhaust gas recirculation rate at a constant rpm on the basis of characteristic curves indicating the exhaust gas temperature (T4), in the form of differential temperature between the exhaust gas temperature and the aspirated air temperature (T4—T1) in accordance with the load; with the aspirated air quantity and with the engine rpm; and triggering an adjusting member in the exhaust gas recirculation line along these curve courses; determining a set-point differential temperature on the basis of the instantaneously measured aspirated air mass and the engine rpm (n); determining the exhaust gas temperature as a load signal; and delivering the obtained signal to a comparison point and to a regulator adjusting the exhaust gas recirculation valve.

5. An apparatus for determining and controlling the exhaust gas recirculation rate in an internal combustion engine which comprises an air intake tube, an engine, an exhaust gas tube and a recirculation line extending from said exhaust gas tube to said air intake tube, a temperature determining means (T4) in the exhaust gas tube of the engine upstream of an inlet into the exhaust gas recirculationg line which produces an output value of the temperature of exhaust gases, a regulator having a first input for receiving an output from said temperature-determining means (T4), and an adjusting member in the exhaust gas recirculation line for adjusting flow of gases through said recirculation line, a temperature-determining means (T0) in said air intake tube for measuring ambient air, a temperature-determining device (T1) in said intake tube just upstream of a connection of said recirculating exhaust tube and said air intake tube for measuring aspirated air temperature, an air temperature determining means (T3) in said air intake tube downstream of said connection, a temperature measuring device (T2) in said recirculating exhaust gas tube upstream of said connection, a computer circuit which links the temperature outputs of said temperature detecting means (T1, T2, T3) with one another in such a manner than an actual-value signal for an exhaust gas recirculation rate is produced, which signal is delivered to a second input of said regulator, and said regulator produces a difference output signal which controls said adjusting member in said recirculation exhaust tube.

6. An apparatus as defined by claim 5 which includes an air flow rate meter for measuring aspirated air, a transducer for measuring engine rpm, a computer circuit for receiving output values of said flow rate meter and said transducer for forming a set-point differential temperature between the exhaust gas and the aspirated air quantity and a comparison point for receiving an output from said computer circuit, said temperature detector means (T4) producing an output which represents a load signal which is directed to a second input of said computer circuit, and a regulator which receives a comparison signal from said comparison point.

* * * * *